United States Patent Office 2,918,465
Patented Dec. 22, 1959

2,918,465

TRANSFORMING OXAZINE DYESTUFF BASES TO PIGMENTS

Lawrence D. Lytle, Plainfield, and Robert E. Brouillard, Westfield, N.J., assignors to General Aniline & Film Corporation, New York, N.Y., a corporation of Delaware No Drawing. Application December 3, 1956
Serial No. 625,593

6 Claims. (Cl. 260—246)

The present invention relates to the preparation of pigments from unsulfonated oxazine dyestuff bases.

Dyestuffs of the oxazine series are excellent for dyeing animal, vegetable and viscose artificial fibers with fast and clear blue to violet tints. The use of the unsulfonated bases as pigments has been limited, because conditioning into pigmentary form has involved a very troublesome process. This process consists of ball milling the base dye (unsulfonated) in comparative dilute sulfuric acid (60%). Conditioning in this manner creates very severe corrosion problems and gives a product which varies considerably in shade and strength. Another deficiency of acid milling procedure is that the oxazine base is very readily sulfonated and substantial product losses are experienced with this method.

Accordingly, the preparation of oxazine bases in a finely divided solid state, i.e. in pigment form, constitutes the principal object of the present invention.

Other objects and advantages will become manifest from the following description.

We have found that oxazine dye bases characterized by the following general formulae

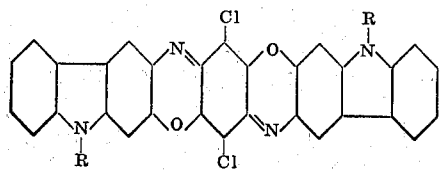

and

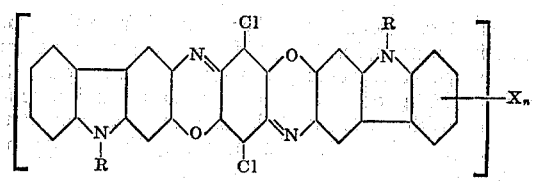

wherein R represents either hydrogen, alkyl or benzyl, X represents either chlorine or bromine, and $n$ represents a numeral from 1 to 4, such as methyl, ethyl, propyl, etc., are readily and efficiently transformed into a finely divided pigment of high tinctorial strength and stability by milling the dye base in the presence of a finely divided inorganic salt and in the presence of water soluble organic hydroxylated compound for a period of time ranging from 8–48 hours. Usually milling for 16–20 hours gives the desired results.

The oxazine dye bases, i.e. in unsulfonated form, are readily prepared by the procedures outlined in United States Patents 2,016,013; 2,026,092; 2,115,508 and 2,143,598, the specifications of which are included herein by reference thereto for all specific examples of dyes falling within the ambit of the foregoing general formulae.

The inorganic salts that may be employed fall into two general categories:

(1) Water soluble inorganic salts such as sodium chloride potassium chloride, sodium sulfate, the various sodium or potassium phosphates, etc. These salts are removed after the conditioning process to give a substantially pure pigment.

(2) Water insoluble salts such as barium sulfate, calcium sulfate, aluminum hydrate, magnesium hydrate, etc., which remain with the pigment to give a lake.

1–20 parts of salts on the weight of the pigment may be used. We prefer 6–10 parts with water soluble salts and 1–5 with water insoluble salts.

As for the water soluble organic hydroxylated compounds, all liquid water soluble glycols, their ethers and alcohols may be employed. Illustrative examples of such compounds include:

n-And iso-propyl alcohol
Butyl alcohol
Ethylene glycol
Propylene glycol
1,2-propylene glycol
Butylene glycol
Trimethylene glycol
Triethylene glycol
Tetraethylene glycol
Pentaethylene glycol
Polyethylene glycol
2,3-butanediol
1,3-dipropanediol
Diethylene glycol
Dipropideneglycol or di-1,3-propanediol
Diethylene dipropylene glycol
Ethylene propylene glycol and mixtures of said glycols
2,2-dimethyl-1,3-propanediol
Hexaethylene glycol
Dialkyl ethers of mono-, di-, and trialkylene glycols such as, for example $$ROCH_2CH_2OR$$

Dialkyl ethers of ethylene glycol $$ROCH_2CH_2OCH_2CH_2OR$$

Dialkyl ethers of diethylene glycol $$ROCH_2CH_2OCH_2CH_2OCH_2CH_2OR$$

Dialkyl ethers of triethylene glycol $$CH_2CH(OR)CH_2OR$$

Dialkyl ethers of propylene glycol $$CH_3CH(OR)CH_2OCH_2CH(OR)CH_3$$

Dialkyl ethers of dipropylene glycol $$ROCH_2CH(C_2H_5)CH(OR)C_3H_7$$

2-ethylhexane-1,3-dialkyl ether $$CH_3CH(OR)CH_2CH(OR)CH_3$$

Pentanediol-2,4-dialkyl ether $$CH_3C(OR)(CH_3)CH_2CH(OR)CH_3$$

Dialkyl ethers of hexylene glycol wherein each R represents an alkyl group containing from 1 to 5 carbon atoms.

It is to be noted that any one of the above dialkyl ethers may be either symmetrical or unsymmetrical. A large number of them are commercially available and the others are well known compounds being described in patent and technical literature. In view of this, it is not deemed necessary to give a specific example of each, i.e. symmetrical and unsymmetrical types, since those skilled in the art will have no difficulty in making the selection from the above formulae. As a guide, it may be desirable, however, to give a specific illustration of a given type, such as, for example, the dialkyl ethers of ethylene glycol, which are as follows:

Dimethyl ether of ethylene glycol
Diethyl ether of ethylene glycol
Dipropyl ether of ethylene glycol
Dibutyl ether of ethylene glycol
Methylethyl ether of ethylene glycol
Methylpropyl ether of ethylene glycol
Ethylpropyl ether of ethylene glycol
Propylbutyl ether of ethylene glycol The same applies to the polyalkylene glycols referred to above.

A mixture of the foregoing alcohols, glycols and glycol ethers may also be employed. From 1 to 10 parts of the water soluble hydroxylated compound on the weight of the oxazine dye is employed during the milling operation. We prefer to employ 1–3.5 parts when using a Werner-Pfleiderer mill, and 3.5–10 when using a ball mill. A Werner-Pfleiderer is preferred, although any apparatus which exerts shear is operable.

By subjecting oxazine dye bases to the foregoing milling operation, a pigment is obtained with 20 to 35% greater tinctorial strength than that obtainable by the prior art method. At the same time the shade of the pigment becomes much redder. The latter is wholly surprising since it would be expected to become greener. The following examples are illustrative of the preferred embodiments of the present invention. All parts are by weight.

Example I 100 parts of the unsulfonated oxazine dyestuff base of Example 1 of U.S.P. 2,026,092 are mixed with 200 parts of ethylene glycol and 800 parts of finely divided sodium chloride and kneaded in a Werner-Pfleiderer mixer for 18 hours. The mass obtained is drowned into 10,000 parts of water under agitation. The slurry which results is filtered and washed free of salt and glycol. The product so obtained may be dried to a powder of excellent pigmentary properties or kept as a presscake. When the presscake is flushed into lithographic varnish it is 30% stronger and much redder than that obtained by the normal procedure of ball milling with acid.

Similar results are obtained when propylene glycol, glycerol, methyl Cellosolve or n-propyl alcohol are substituted for ethylene glycol.

Example II 100 parts of the unsulfonated oxazine dyestuff of Example 5 of U.S.P. 2,016,013 are mixed with 250 parts of Carbitol and 800 parts of sodium chloride and kneaded in a Werner-Pfleiderer mixer for 24 hours. The mass obtained is drowned into 9000 parts of water under agitation. The slurry which results is filtered and washed free of salt and Carbitol. The product so obtained on flushing into an oleoresinous vehicle is 25% stronger and much redder than that obtained by ball milling with sulfuric acid.

Similar results are obtained when sodium sulfate or potassium acid phosphate are substituted for sodium chloride.

Example III 100 parts of the unsulfonated dyestuff of Example 3 of U.S.P. 2,016,013 are mixed with 300 parts of methyl Cellosolve and 1000 parts of sodium chloride and the mixture ball milled for 40 hours.

The mass obtained is drowned into water under agitation, filtered and washed free of salt and methyl Cellosolve. The pigment obtained has properties similar to those obtained in Example II.

Example IV 100 parts of the unsulfonated oxazine dyestuff of Example 1 of U.S.P. 2,016,013 are mixed with 200 parts of ethylene glycol and 400 parts of barium sulfate and agitated in a Werner-Pfleiderer mixer for 24 hours. The product is purified and isolated by drowning in water, filtering, and washing to remove the glycol.

The pigment obtained has excellent strength and is much redder than that obtained by conventional conditioning methods.

Example V 100 parts of the unsulfonated base of Example 2 of U.S.P. 2,082,344 are mixed with 800 parts of finely divided sodium chloride and 250–300 parts of ethylene glycol to give a stiff kneading mass. After kneading in a Werner-Pfleiderer mixer for 15–24 hours, the mass is slurried up in 6000–8000 parts of water, filtered, and washed free of salt and glycol. The product may be used as a presscake or dried to a powder.

We claim:

1. The method of producing a tinctorially strong oxazine dyestuff base in a pigmentary state which comprises grinding, in admixture 1–10 parts by weight of a water soluble alkylene glycol containing from 2 to 12 carbon atoms, 1–20 parts by weight of a finely divided inorganic salt selected from the class consisting of alkali metal chlorides, sulfates and phosphates, barium and calcium sulfates, and aluminum and magnesium hydrates, and 1 part by weight of an oxazine dye base selected from the class consisting of those of the following formulae:

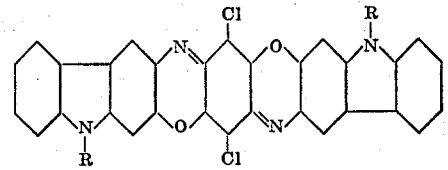

and

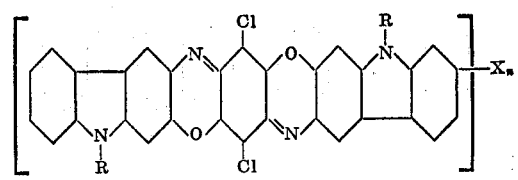

wherein R represents a member selected from the group consisting of hydrogen alkyl of from 1 to 3 carbon atoms, and benzyl, X represents a halogen selected from the class consisting of chlorine and bromine, and $n$ represents a positive integer of from 1 to 4, extracting the ground mass with water and recovering the residual pigment.

2. The method according to claim 1 wherein the oxazine dye base has the following formula:

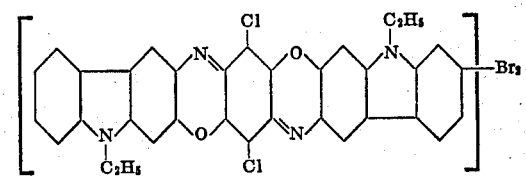

3. The method according to claim 1 wherein the oxazine dye base has the following formulae:

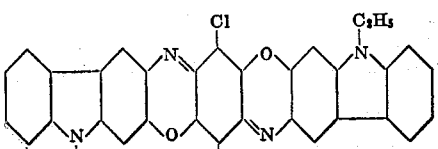

4. The method according to claim 1 wherein the oxazine dye has the following formula:

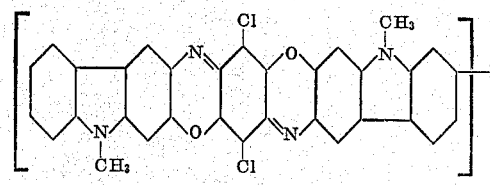

5. The method according to claim 1 wherein the oxazine dye base has the following formula:

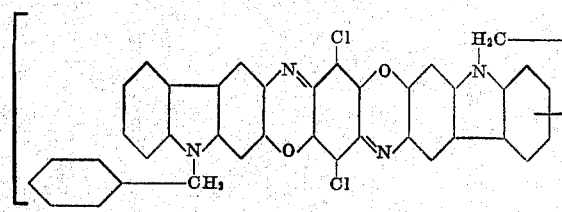

6. The method according to claim 1 wherein the oxazine dye base has the following formula:

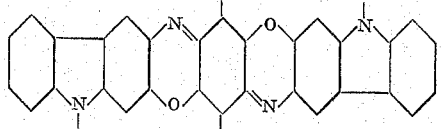

References Cited in the file of this patent
UNITED STATES PATENTS 2,556,727     Lane _____ June 12, 1951

FOREIGN PATENTS 566,325     Great Britain _____ Dec. 22, 1944
569,402     Great Britain _____ May 22, 1945

OTHER REFERENCES

Harrison: Mfg. of Lakes and Precipated Pigments, Leonard Hill Limited, London (1957), p. 58.